United States Patent [19]

Allport

[11] Patent Number: 6,062,104
[45] Date of Patent: May 16, 2000

[54] DEVICE FOR ISOLATING TORQUE FLUCTUATIONS

[75] Inventor: John M. Allport, Barkisland, United Kingdom

[73] Assignee: Simpson International (UK) Ltd., Halifax, United Kingdom

[21] Appl. No.: 09/180,460

[22] PCT Filed: May 15, 1997

[86] PCT No.: PCT/GB97/01331

§ 371 Date: May 3, 1999

§ 102(e) Date: May 3, 1999

[87] PCT Pub. No.: WO97/43563

PCT Pub. Date: Nov. 20, 1997

[30] Foreign Application Priority Data

May 16, 1996 [GB] United Kingdom ............... 9610253

[51] Int. Cl.[7] .................................................. F16F 15/10
[52] U.S. Cl. ........................ 74/574; 74/572; 74/573 R; 29/897.2; 464/89; 192/68
[58] Field of Search ................ 74/572–574; 310/51; 192/68; 464/74, 89; 29/897.2

[56] References Cited

U.S. PATENT DOCUMENTS

| 2,028,951 | 1/1936 | Reed ............................ 192/68 |
| 2,058,575 | 10/1936 | Drude .......................... 192/68 |
| 2,065,601 | 12/1936 | Meyer .......................... 192/68 |
| 3,138,039 | 6/1964 | Zeidler et al. .............. 74/574 |
| 3,809,198 | 5/1974 | Mori ........................... 192/106.2 |
| 4,376,477 | 3/1983 | Loizeau ....................... 192/106.2 |
| 5,058,267 | 10/1991 | Andra et al. ................ 29/897.2 |
| 5,468,055 | 11/1995 | Simon ......................... 301/6.91 |
| 5,562,544 | 10/1996 | Ochs et al. .................. 464/89 |
| 5,884,735 | 3/1999 | Eckel et al. ................ 188/378 |
| 5,931,052 | 8/1999 | Zhao et al. .................. 74/574 |

FOREIGN PATENT DOCUMENTS

| 0283234 | 9/1988 | European Pat. Off. ........... 310/51 |
| 2518258 | 11/1975 | Germany . |
| 419410 | 12/1934 | United Kingdom . |
| 2258517 | 2/1993 | United Kingdom . |

*Primary Examiner*—Vinh T. Luong
*Attorney, Agent, or Firm*—Akin, Gump, Strauss, Hauer & Feld, L.L.P.

[57] ABSTRACT

An isolating device (10) isolates fluctuations in torque of a drive shaft about a nominal torque value. The device comprises a first annular member (11) for connection to a rotary driving shaft and a second annular member (12) designed for connection to a driven piece of equipment such as a fan or alternator in an internal combustion engine. The first (11) and second (12) annular members are interconnected by a plurality of elastomeric elements (23) which are pre-compressed in a circumferential direction between retaining plates fixed to the first and second annular members (11, 12). The pre-compression permits a minimum torque of the drive shaft for a nominal torque level to be transmitted to the driven member load substantially without deflection of the elastomeric element (33). Hence there is little or no relative rotational displacement of the first and second members (11, 12) of the isolating device (10) during start up until the working range of the device is reached.

11 Claims, 3 Drawing Sheets

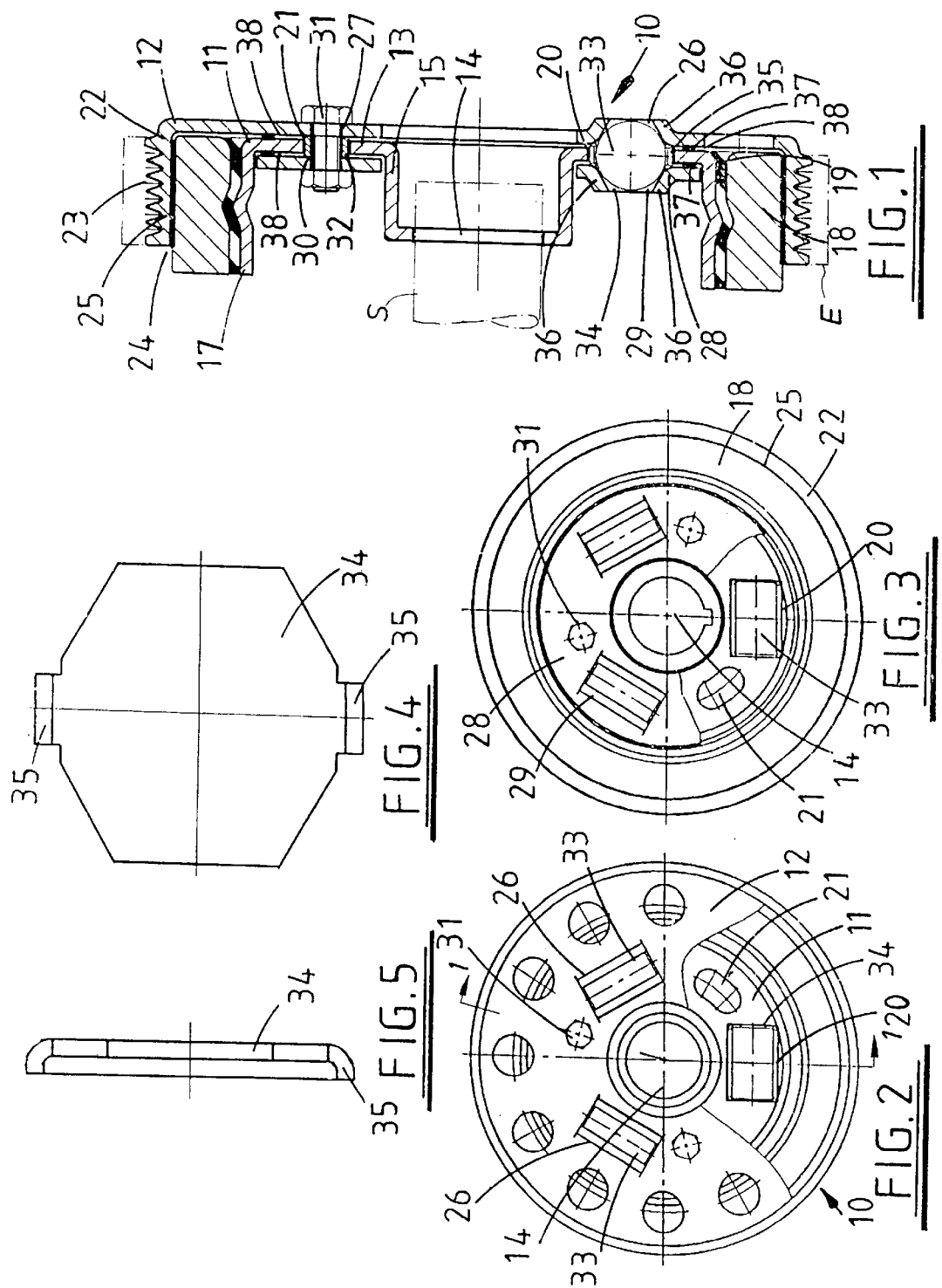

DEVICE FOR ISOLATING TORQUE FLUCTUATIONS

CROSS-REFERENCE TO RELATED APPLICATIONS

This application claim priority from PCT Patent Application No. GB97/01331 filed on May 15, 1997 and Great Britain Patent Application No. GB 9610253.8 filed on May 16, 1996.

STATEMENT REGARDING FEDERALLY SPONSORED RESEARCH

Not applicable.

BACKGROUND OF THE INVENTION

1. Field of the Invention

The present invention relates to an isolating device and more particularly to such a device for isolating fluctuations in the actual drive torque of a drive shaft of a machine about a nominal drive torque level.

2. Description of the Prior Art

Such isolating devices are well known and are often mounted on the crankshaft of the internal combustion engine of a motor vehicle so that it can drive a driven component such as an alternator, a fan or other piece of equipment. Devices of this type are often fitted with a torsional vibration damper in the form of an annular inertia member mounted on an elastomeric material.

One example of an isolating device of this kind is disclosed in the applicant's co-pending PCT application No. GB 96/00371. This application describes a drive device comprising a primary element connected to the drive shaft and a secondary element having a contoured pulley rim to which a V-belt drive is attached. The belt transmits power from the drive shaft to a driven component. The primary and secondary elements are interconnected by a torsionally flexible elastic ring which is loaded in shear and effectively absorbs rotational fluctuations in the motion of the driving shaft so that they are not transmitted to the driven component. Torsional vibrations of the shaft to which the device is attached are damped by means of an inertia ring connected to the primary element by means of an elastic element.

One disadvantage of a device of this type is that the primary and secondary elements are subject to a relatively large relative rotational displacement during initial loading before the drive torque is transmitted to the load through the torsionally flexible elastic ring. Moreover, if the torsionally flexible elastic ring should fail through age or excess loading the coupling provides no drive connection between the driving shaft and the driven member.

Another isolating device is described in UK Patent No. 2258517. In this case primary and secondary elements are coupled to one another by coil compression springs. In use the springs are compressed and absorb rotational fluctuations of the driving shaft. In order to provide an appropriate isolation characteristic the coil compression springs occupy a significant amount of space. Moreover, at large relative rotational displacements of the primary and secondary elements the springs reach their limit of compression and the individual coils come into contact with one another so that no further compression is possible. At this stage torque is transferred directly through the device without isolation.

SUMMARY OF THE INVENTION

It is an object of the present invention to obviate or mitigate the aforesaid disadvantages.

According to the present invention there is provided an isolating device for isolating fluctuations in torque of a drive shaft, the device comprising a first member for connection to a rotary driving shaft and a second member designed for connection to a driven member, and at least one resilient element interposed between the first and second members so as to be compressed in a circumferential direction relative to the drive shaft when the drive shaft is applying torque to the driven member within a predetermined torque range at which the device is designed to operate, wherein the absence of an applied torque the resilient member biases the first and second members into a predetermined relative position in which a stop on one member bears against the other member, the resilient member being pre-stressed such that the first and second members are maintained in the predetermined relative position when the applied torque is less than said predetermined torque range.

The resilient element may be retained in a pre-compressed state in aligned apertures of the first and second members. Retaining plates may be provided on the first and second members to retain the element in the pre-compressed state.

The first and second members are preferably rotationally displaceable relative to one another such that the apertures become misaligned and the retaining plates move relative to one another.

The resilient element may be retained axially within the device by retaining edges of the apertures.

Preferably there are a plurality of resilient elements spaced around the isolating device.

Conveniently an inertia member may be connected to said first member via a damping element to absorb torsional vibrations.

An axial bearing may be provided in a clearance between the first and second members so that their relative axial positions are maintained.

Preferably a radial bearing is provided between a rim of the second annular member and the inertia member.

BRIEF DESCRIPTION OF THE DRAWINGS

A specific embodiment of the present invention will now be described, by way of example only with reference to the accompanying drawings in which:

FIG. 1 view taken along line 1—1 of FIG. 2 of an isolating device of the present invention, a drive shaft and a belt of driven equipment shown in dashed lines is a sectioned side;

FIG. 2 is a part cut-away front view of the device of FIG. 1.

FIG. 3 is a part cut-away view of the device of FIG. 1 with a secondary member removed;

FIGS. 4–5 are respectively front and side views of a retaining plate of the device;

DESCRIPTION OF THE PREFERRED EMBODIMENT

Figure 6:
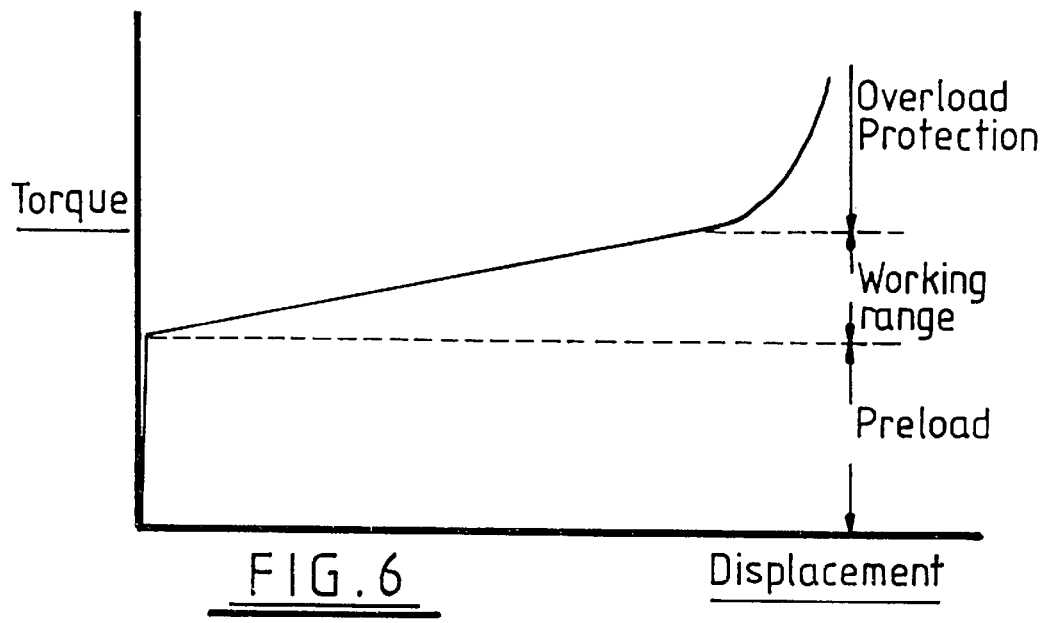
FIG. 6 is a graph of torque vs. displacement for the isolating device of the present invention.

Referring now to FIGS. 1 to 3, the isolating device 10 comprises concentric first and second annular members 11, 12. The first annular member 11 is designed in this particular embodiment for key-connection to a rotary driving shaft S (FIG. 1) for example the crankshaft of an internal combustion engine of a motor vehicle. The second annular member 12 is designed to connect to a driven piece of equipment (not shown) of a vehicle such as an alternator or fan etc. so that the engine can drive the driven equipment.

The first annular member 11 comprises a disc 13 with a central aperture 14 for receiving the rotary shaft S. The disc 13 has a central hub 15 extending predominantly parallel to the rotational axis of the rotary shaft S and, at its radially outer periphery, a ring 17 extending in parallel to the hub direction.

The peripheral ring 17 supports, on its radially outer surface, an annular inertia member 18 which is fixed thereto by means of an intermediate elastomeric layer 19 mounted in compression. Such an arrangement is well known and acts as a damper against torsional vibrations in the rotary driving shaft S. The inertia of the inertia member 18 and the elastic characteristics of the intermediate elastomeric layer 19 are selected according to the dynamic characteristics of the rotary driving shaft S and the driven equipment to provide the required torsional vibration damping.

The disc 13 of the first annular member 11 has three equi-angularly spaced rectangular apertures 20 interspersed by arcuate slots 21, the function of which will be described later.

The second annular member 12 has a peripheral pulley rim 22 which extends parallel to the rotational axis of the shaft S. The radially outer surface of the pulley rim 22 has a v-groove configuration 23 designed to receive a drive belt E or connected to the driven equipment. In alternative embodiments (not shown) the pulley rim surface may have an alternative configuration, for example chain sprockets to receive a chain drive.

The pulley rim 22 extends over the radially outer surface of the inertia member 18 with a radial small clearance 24. A low friction polymeric bearing 25, such as ptfe or nylon tape, is placed in the clearance to form a radial guide bearing for the pulley rim 22.

The second annular member 12 has three rectangular apertures 26 that correspond to and are aligned with those 20 in the first annular member 11. The rectangular apertures 26 are interspersed by fixing holes 27 that are aligned with the arcuate slots 21 in the first annular member 11. A support ring 28 is fitted in an annular channel defined radially between the hub 15 and the peripheral ring 17 of the first annular member 11. The ring 28 has rectangular apertures 29 and fixing holes 30 aligned to those in the second annular member 12 and is fixed to the second annular member 12 by means of bolts 31 that pass through the arcuate slots 21 in the first annular member 11 and through the respective fixing holes 29, 27 of the support ring 28 and the second annular member 12. The bolts 31 have bushings 32 that are slidably received in the arcuate slots 21 to permit limited angular movement of the first annular member 11 relative to the second annular member 12 and bolts 31.

In each of the aligned rectangular apertures 20, 26, 29 of the first and second annular members 11. 12 and the support ring 28 respectively there is fitted a pre-compressed cylindrical block of elastomeric material 33. Each elastomeric block 33 is retained and compressed in the direction of rotation of the isolating device between pair of retaining end plates 34 that are shown in FIGS. 4 and 5. Each end plate 34 is approximately hexagonal and has locating tongues 35. During relative rotational movement of the annular members 11, 12 the end plates 34 of each pair move towards each other thus compressing the corresponding elastomeric block 33.

Each elastomeric block 33 is retained axially of the drive device 10 by lips 36 on the support ring 28 and the second annular member 12. The lips 36 are formed by outwardly directed formations in the structure of the support ring 28 and second annular member 12 along the major edge of each rectangular aperture 20, 26, 29.

Axially retaining low friction bearings 37 are positioned in axial clearances 38 between the first annular member 11 and the support ring 28 and between the first annular member 11 and the second annular member 12. In the particular embodiment shown the axially retaining low friction bearings 37 are positioned radially outside the elastomeric cylindrical blocks 33 and are manufactured from a suitable low friction polymeric material. However, in alternative embodiments of the present invention they may be positioned elsewhere. The bearings 37 act to maintain the axial alignment of the pulley rim 22 relative to the hub 15.

Figure 7:
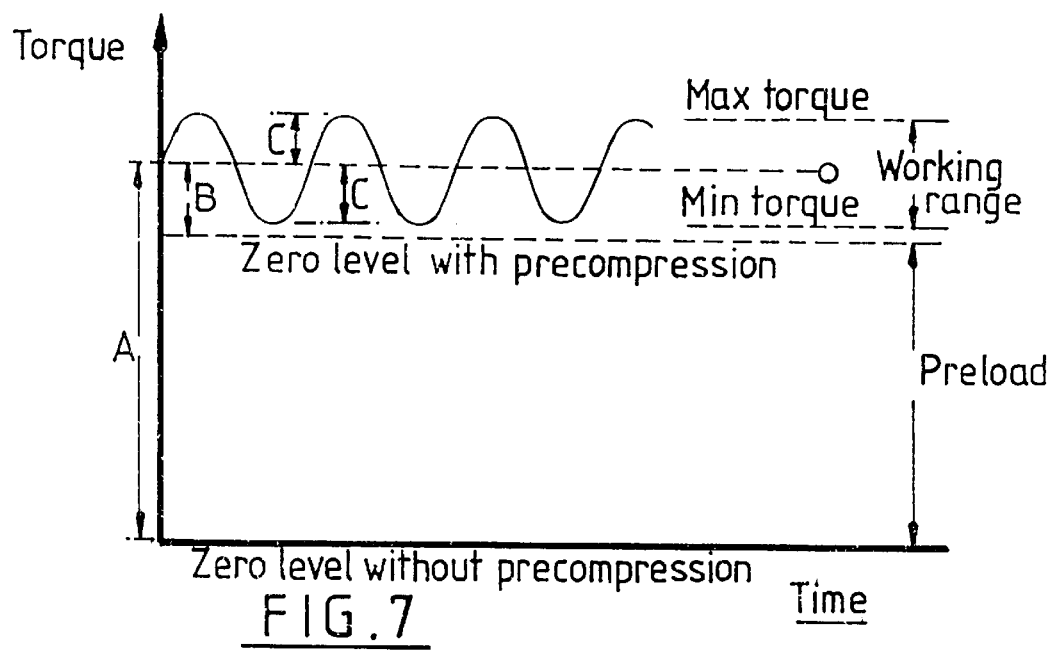
FIG. 7 is a graph of torque vs. time for the isolating device of the present invention.

In use, the elastomeric blocks 33 of the isolating device reduce cyclic fluctuations in the actual drive torque of the rotary driving shaft S so that these are not transmitted to the driven equipment via a belt or chain E driven by the pulley rim 22. The relative angular displacement of the first and second annular members 11, 12 caused by the cyclic fluctuations is limited by the length of the arcuate slots 21. Since each elastomeric cylindrical block 33 is pre-compressed along its longitudinal axis between end plates 34, this biases the first and second annular members 11, 12 to a relative rotational position in which the bolts 31 abut the ends of the arcuate slots 21. The blocks 33 collectively carry the drive torque of the drive shaft S without substantial further deflection of the elastomeric blocks 33 up to the working range of the isolating device 10. The working range is the range of torque, around a nominal mean torque value, at which the isolation device is designed to be effective in isolating cyclic fluctuations. Referring to FIGS. 6 and 7, it will be appreciated that this means that the torque during initial loading (i.e. from when the driving shaft S first starts to rotate to when it reaches the working range around the nominal mean torque level) is carried without significant deflection of the elastomeric blocks and thus the annular members 11, 12 do not move relative to one another and the bolts 31 remain in abutment with the ends of the arcuate slots 21 during initial loading. This arrangement means the relative angular movement of the first and second annular members 11, 12 is limited to the working range and the arcuate slots 21 can be made correspondingly short, thus simplifying the design of the device. It will be seen from FIG. 6 that very little relative displacement of the annular members 11, 12 occurs before the working range of torque is reached. The limits of displacement of the annular members 11, 12 may be confined to a very small part of the approximately straight line in the working range shown in FIG. 6. The actual region of operation along the working range line depends on the load applied to the engine at any particular time.

The contour of the retaining lips 36 can be selected to govern the characteristic of the elastomeric block deflection as the blocks 33 swell and abut the surface of the lips 36. In particular, the curve of the graph in the overload protection region indicated in FIG. 6 can be tailored according to the requirements of the particular application. The gradual curve provided by the contact of the lips 36 with the blocks 33 represents a cushioned stop at the limit of their deflection. This is in contrast to prior designs, in particular where compression spring are used, in which the limit of deflection is generally reached with a sudden jolt (i.e. a substantially straight and near-vertical line on the graph) resulting in a shock load being transmitted to the drive belt.

In FIG. 7 it is shown that the driving torque of the drive shaft S fluctuates cyclically with rotation of the shaft S between maximum and minimum values for a nominal torque value. The relative deflection of the first and second annular members fluctuates cyclically in the same manner by an amount +/– C about a line of mean relative deflection (indicated by reference symbol O).

For a standard known isolating device the annular members would undergo a relative rotational deflection indicated by A before the nominal torque was transferred to the driven equipment by the isolating device. In the present invention the elastomeric blocks 33 are retained in the rectangular apertures in a pre-compressed state equivalent to a preload torque indicated by the line at distance B from the line O of mean torque. This line effectively represents a shift (of A–B) in the position where deflection commences and it falls just short of the minimum torque level in the fluctuation about the nominal mean torque level. This means that there is little or no relative rotational deflection of the annular members of the device during initial loading since the pre-compression is sufficient to carry the initial torque before the working range in reached.

It will be appreciated that deflection range B indicating the compression of the block to the nominal mean level must be slightly greater than the fluctuation C so that collision between the bushings 32 on bolts 31 and the ends of arcuate slots 21 in the first annular member 11 is avoided when the fluctuating torque reaches the minimum level.

The device effectively isolates the cyclical fluctuations in the rotary drive shaft S so that they are not passed to the pulley rim 22. Furthermore the inertia member 18 and elastomeric layer 19 clamp torsional vibration in the drive device.

It will be appreciated that since the elastomeric blocks 33 are in compression and are retained by the lips 36 the design is intrinsically fail-safe and will continue to drive should the elastomeric blocks 33 fail. Even if the elastomeric blocks should become dislodged from their respective apertures the device will still drive the driven equipment by virtue of the connection between the first and second annular members provided by the bolts 31 in the arcuate slots 21.

The load carrying characteristics of the device can be modified according to the particular application by replacing the elastomeric blocks 33 with others of different elastic characteristics.

Figure 8:
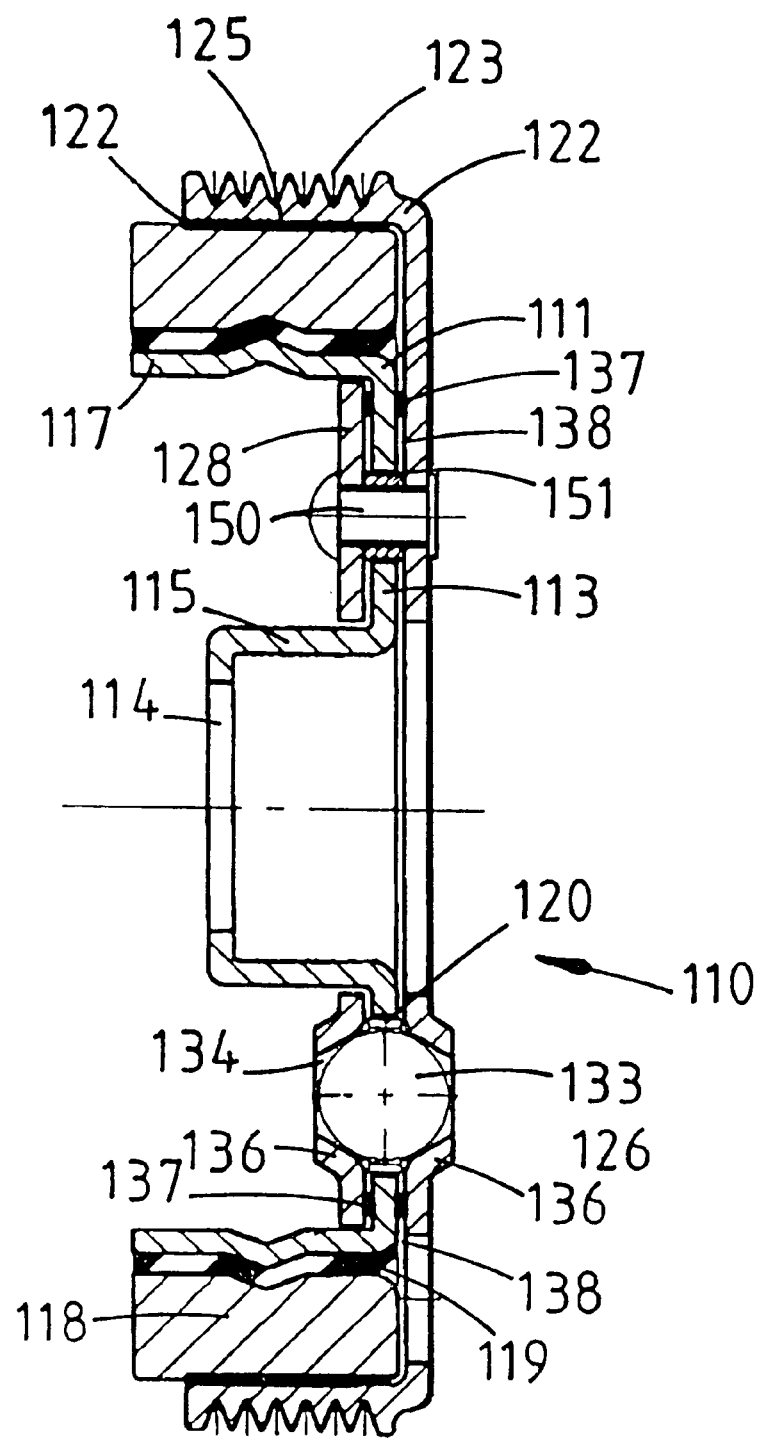
FIG. 8 is a sectioned side view of an alternative embodiment of the present invention.

FIG. 8 shows an alternative embodiment of the present invention in which parts corresponding to those shown in FIG. 1 are indicated by the same reference numeral but increased by 100 and are not further described except insofar as they differ from their counterparts in FIG. 1. In this embodiment the bolts 31 of the design shown in FIG. 1 have been replace by rivets 150. Each rivet 150 supports a bushings 151 that may or may not be integral.

It will be understood that numerous modifications to the above described designs may be made without departing from the scope of the invention as defined in the appended claims. For example, the first annular member 11 may be fitted to the rotary driving shaft S by any suitable means such as spline or shrink connection. In addition the presence of the inertia member to damp torsional vibrations is optional. When there is no inertia member or intermediate elastomeric layer, the peripheral ring 17 of the first annular member 11 may support the radial guide bearing 25 directly. Furthermore, the radial guide bearing may be manufactured from any appropriate material and in particular a thin film of low friction varnish may be sprayed on to the adjacent bearing surfaces.

The elastomeric blocks need not be cylindrical but may be of any convenient shape. In particular, the blocks may be tapered at either end, barrel shaped or waisted in a central portion to provide a dog-bone shape. The retaining plates may be bonded or otherwise attached to the ends of each elastomeric block.

What is claimed is:

1. An isolating device for isolating fluctuations in torque of a drive shaft, the device comprising a first member adapted for connection to a drive shaft and a second member adapted for connection to a driven member, an inertia member connected to the first member via a damping element, and at least one resilient element interposed between the first and second members so as to be compressed in a circumferential direction relative to the drive shaft when the drive shaft is applying torque to the driven member within a predetermined torque range at which the device is designed to operate, wherein the absence of an applied torque the resilient member biases the first and second members into a predetermined relative position in which a stop on one member bears against the other member, the resilient member being pre-stressed such that the first and second members are maintained in the predetermined relative position when the applied torque is less than said predetermined torque range.

2. An isolating device according to claim 1, wherein the resilient element is retained in said pre-stressed state by being compressed in aligned apertures of the first and second members.

3. An isolating device according to claim 1, wherein the resilient element is pre-compressed between retaining plates on the first and second members.

4. An isolating device according to claim 3, wherein in use the first and second members are rotationally displaceable relative to one another such that the retaining plates move relative to one another.

5. An isolating device according to claim 1, wherein the resilient element is retained axially.

6. An isolating device according to claim 5, wherein the resilient element is retained axially by retaining edges around aligned apertures of the first and second members.

7. An isolating device according to claim 1, wherein there is a plurality of resilient elements spaced around the isolating device.

8. An isolating device according to claim 1, wherein the or each resilient element is in the form of a cylindrical block of elastomeric material.

9. An isolating device according to claim 1, wherein there is provided an axial retaining bearing in an axial clearance between the first and second members.

10. An isolating device according to claim 1, wherein a radial egde bearing is provided between a rim of the second member and the inertia member.

11. An isolating device according to claim 1, wherein the stop comprises an axial fixing on one member moveable in an arcuate slot of the other member.

* * * * *